Dec. 30, 1969  G. CLAAS  3,487,191
ELECTRIC SPOT WELDING APPARATUS
Filed Aug. 25, 1966
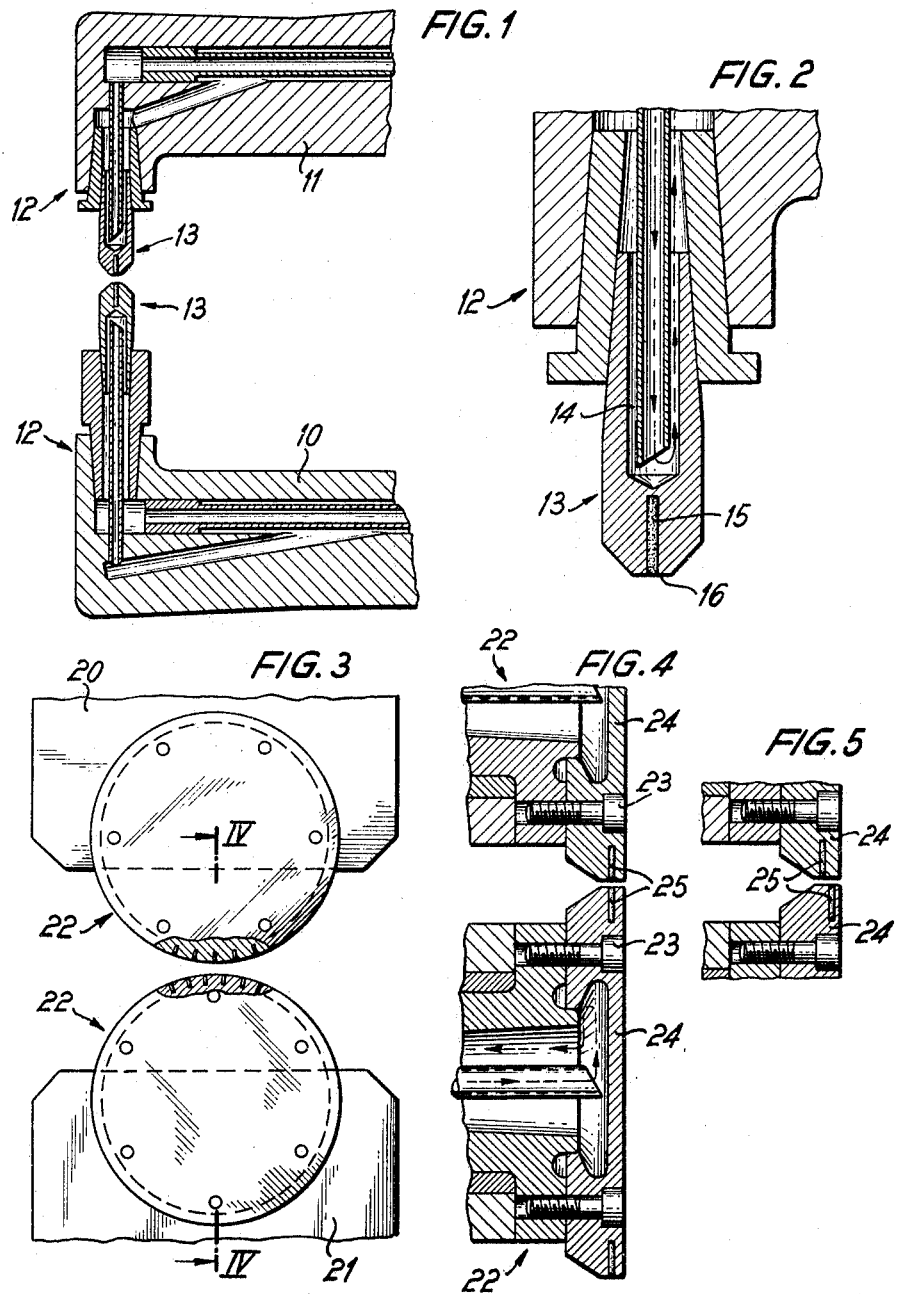
INVENTOR
Günther Claas
by Michael S. Striker
Attorney United States Patent Office 3,487,191
Patented Dec. 30, 1969

3,487,191
ELECTRIC SPOT WELDING APPARATUS
Günther Claas, Am Rovekamp 1, Harsewinkel,
Westphalia, Germany
Filed Aug. 25, 1966, Ser. No. 575,022
Claims priority, application Germany, Aug. 28, 1965,
C 36,757
Int. Cl. B23k 9/24
U.S. Cl. 219—119                5 Claims

ABSTRACT OF THE DISCLOSURE

An electric spot welding apparatus in which at least one of the electrodes comprises an outer part of high electrical conductivity and being formed with at least one recess extending from a pressure face of the outer part into the latter, and an electrically conductive insert of lower conductivity than that of the outer part located in the recess and having a pressure face flush with that of the outer part.

---

The invention relates to electric spot welding apparatus comprising electrodes for supplying the electrical energy needed to produce the heat, and the necessary pressure for joining the workpieces (such as metal plates), in which at least one electrode comprises a sheath part and an insert.

In the known electric spot welding apparatuses, the electrodes are as a rule made from largely pure copper in order to achieve as low an electrical resistance as possible. If particularly exacting requirements are made of the mechanical strength of the electrodes needed to produce the welding pressure, provision has in the past been made for the copper electrodes to have inserts or inlays of mechanically more resistant alloys which nevertheless offer a really high electrical conductivity. In any case, the endeavour hitherto has been to impart maximum electrical conductivity to the electrodes, having regard to the necessary mechanical strength. It has now been found that, with the known electrodes, it is not possible to spot weld reliably and economically metal plates which have readily conductive metallic coatings, particularly galvanised plates, the thickness of which falls below certain values, i.e. is less than 3–5 mm. It can be assumed that this deficiency is attributable to the relatively high conductivity of the metal coatings which means that particularly large areas and readily conductive cross-sections are available for the transference of current and counteract the attainment of welding temperatures in a closely limited area, i.e. the envisaged welding zone. Experience has shown that sensible adaptation of the welding pressure, current strength and welding time, is not sufficient to counteract this deficiency satisfactorily.

It is a principal object of the invention to provide an improved spot-welding apparatus for galvanised plates.

It is a further object of the invention to provide an electric spot welding apparatus such that even workpieces having readily conductive surface coatings and relatively minimal wall thicknesses can be spot welded economically and reliably with no necessity for making special demands of the current strengths or welding time used.

It is another object of the invention to provide spot-welding apparatus which does not require frequent overhaul.

According to the invention, there is provided electric spot welding apparatus, comprising electrodes for supplying the electrical energy needed to produce the heat, and the necessary pressure, for joining the workpieces, in which at least one electrode comprises a sheath part and an insert disposed in a recess in the sheath part and open towards the working face of the electrode, the insert containing a substantially non-metallic material having a lower electrical conductivity than the sheath part.

Electrodes of this type differ from the known forms in that, on the pressure and contact-face side, a cross-sectional area is provided which has only a relatively small degree of electrical conductivity.

Contrary to the experience of experts, investigations have confirmed that it is possible, with such electrodes, by applying conventional current strengths and welding times, to carry out reliable spot welds, the electrodes in addition having a durability to withstand even high demands, i.e. not requiring frequent overhaul as in the past. The causes of these decidedly progressive effects, particularly in the spot welding of bright, relatively this plates or such plates as have readily conductive metallic surface coatings, are not yet fully clear. Since obviously, with the use of the electrode according to the invention, the welding zones with the greatest surface expansion are displaced out of the contact plane of the workpieces which are to be joined, towards the outer faces thereof, i.e. instead of the hitherto conventional so-called weld lens, an approximately cylindrical weld area is produced which is preferably crimped in the longitudinal centre, it could indeed be assumed that the substantially non-metallic insert disposed in the electrode according to the invention leads directly or through a rapid distribution of the parts of the insert material over the entire pressure area of the electrode, to an increase in the electrical transfer resistance between the electrode and the associated workpiece area which resulted in a more marked heating in this area and directly promoted the generation of the heat necessary for the welding process in the contact zone of the workpieces to be joined. It would also appear to be possible that the greater heat generation in the transition between the electrode and the outer face of the workpiece acts in the sense of concentrating the current flow in the basic material of the workpieces at the site of the weld. In addition, it would seem definite that the layer obviously forming on the pressure face of the electrode from parts of the insert counteracts any alloying of the electrode material with parts of the metallic coating of the workpieces, since the electrode retains unaltered, over relatively long periods, the properties which admit of trouble-free and economical working and which are produced after a few spot welds have been made.

The composition of the insert can be modified. Perfect results during spot welding of galvanized plates of thicknesses less than 5 mm. have been achieved for example with electrodes of which the insert resembles a commercial quality pencil lead in composition and structure. In passing, it should be mentioned that, in these electrodes, the cross-section of the insert can also roughly correspond to that of a pencil lead, i.e. a diameter of 2–3 mm.

The invention can, of course, also be carried into effect in welding apparatus having roller-like electrodes for aligning spot welds linearly into one continuous seam. In this case, it is advisable, if possible, to dispose the pin or annular inserts of the rollers with respect to one another so that they have a staggered action on the workpieces which are to be joined.

Embodiments of the invention are illustrated, by way of example, in the accompanying drawings, in which:

FIG. 1 is a longitudinal cross-section through part of a spot welding apparatus essential for the invention;

FIG. 2 is a longitudinal cross-section, on a larger scale, through an electrode arrangement according to FIG. 1;

FIG. 3 shows part of a roller-equipped spot welding apparatus essential for the invention and intended to produce seams, the diagram being a lateral elevation with part cut away;

FIG. 4 is a cross-section taken along the line IV—IV of FIG. 3, on an enlarged scale;

FIG. 5 is a partial view of a modified embodiment according to FIG. 4.

The embodiment shown in FIGS. 1 and 2 is based on a per se known spot welding apparatus having two carriers 10 and 11 which are movable towards each other in the manner of forceps, the respective facing head parts 12 of which are each equipped with a spot welding electrode 13. The spot welding electrodes 13 may have a per se known outward form and they are in likewise known manner, cooled by a stream of liquid, the liquid being guided through a cavity 14 in the electrode, which cavity is open at the rear. The electrodes 13 are supplied with electric power through per se known switching apparatus, in each case for specific times.

Particularly for the welding of galvanised plates, as shown especially in FIG. 2, each electrode 13 has in it, extending from the pressure face 16, a chamber such as a bore which extends to a point close to the cavity 14 through which water or the like flows for cooling purposes. In the chamber is a substantially non-metallic insert 15 which may be formed by a conventional lead pencil refill. Experience has shown that, with such an electrode, already after a few spot welds have been made, a coating forms on the pressure face 16 which obviously contains graphite to a substantial degree and which, during further working with the electrode, undergoes virtually no change, i.e. the hitherto unavoidable alloying of the electrode material with the metal coating the workpiece is prevented, and that, furthermore, while retaining the conventional current strength and welding times, in other words those which are adapted to the workpiece thicknesses, prefect spot welds are produced.

In the case of the arrangement shown in FIGS. 3, 4 and 5, rollers 22 which are coolable and which serve as electrodes, are mounted on carrier head parts 20 and 21 which are adapted to move towards each other. The end discs 24 of the rollers 22, held by screws 23 and co-operating with the workpieces, form pressure surfaces in which pin-form inserts 25 of the already mentioned type are accommodated. According to FIGS. 3 and 4, the pin-form inserts of both end parts 24 are staggered with respect to each other in the peripheral direction. FIG. 5 shows a modified embodiment in which provision is made to move the pin-form inserts 25 parallel with the pivot axis of the rollers 22. The arrangement according to FIG. 5 could in addition also be used if, instead of pin-form inserts 25, the end plates 24 had annular enclosed inserts of the type according to the invention.

As has already been stated, the embodiments shown are only exemplary forms of the invention. The invention is not confined to them and many other embodiments are possible.

I claim:
1. An electric spot welding apparatus comprising, in combination, support means including two opposite portions movable under pressure toward each other; and at least one electrode mounted on one of said portions for movement therewith towards the opposite portion for spot welding work pieces sandwiched therebetween, said electrode comprising an outer part of high electrical conductivity and having a pressure face adapted to engage a work piece, said outer part being formed with at least one recess extending from said pressure face into said outer part, and an electrically conductive insert disposed in said recess and having a pressure face flush with that of said outer part, said insert consisting essentially of graphite.

2. An electric spot welding apparatus as defined in claim 1, wherein said insert is essentially similar in composition and structure to a commercial quality lead pencil refill.

3. An electric spot welding apparatus as defined in claim 1, wherein an electrode is mounted on each of said opposite portions of said support means.

4. An electric spot welding apparatus as defined in claim 1, wherein said outer part is substantially rod-shaped and wherein said recess is in the form of a bore extending substantially coaxially with and from said pressure face of said rod-shaped outer part into the latter.

5. An electric spot welding apparatus as defined in claim 1, wherein said outer part is in the form of a roller having a peripheral pressure face, and wherein said roller is provided with a plurality of recesses extending in substantially radial direction from said peripheral face into said roller and an insert consisting essentially of graphite located in each of said recesses.

References Cited

UNITED STATES PATENTS

| | | | |
|---|---|---|---|
| 2,282,186 | 5/1942 | Henninger | 219—120 |
| 2,346,088 | 4/1944 | Shobert | 219—119 |
| 1,548,691 | 8/1925 | Thomson | 219—81 |
| 2,109,461 | 3/1938 | Brown | 219—120 |
| 3,382,387 | 5/1968 | Marshall | 310—251 |

FOREIGN PATENTS

| | | |
|---|---|---|
| 336,976 | 5/1921 | Germany. |

JOSEPH V. TRUHE, Primary Examiner

L. A. ROUSE, Assistant Examiner